United States Patent
Waltenberg et al.

(10) Patent No.: US 9,920,719 B2
(45) Date of Patent: Mar. 20, 2018

(54) FILTER DEVICE, IN PARTICULAR FOR GAS FILTRATION

(71) Applicant: MANN+HUMMEL GMBH, Ludwigsburg (DE)

(72) Inventors: Klaus Waltenberg, Grossbottwar (DE); Bernd Joos, Lorch (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 97 days.

(21) Appl. No.: 14/628,275

(22) Filed: Feb. 22, 2015

(65) Prior Publication Data
US 2015/0167602 A1  Jun. 18, 2015

Related U.S. Application Data

(63) Continuation of application No. PCT/EP2013/067423, filed on Aug. 22, 2013.

(30) Foreign Application Priority Data

Aug. 22, 2012  (DE) .......................... 10 2012 016 558

(51) Int. Cl.
*F02M 35/024* (2006.01)
*B01D 46/00* (2006.01)
*B01D 46/24* (2006.01)

(52) U.S. Cl.
CPC ... *F02M 35/02416* (2013.01); *B01D 46/0004* (2013.01); *B01D 46/0005* (2013.01); *B01D 46/2414* (2013.01); *F02M 35/02483* (2013.01); *B01D 2265/021* (2013.01); *B01D 2265/022* (2013.01); *B01D 2265/026* (2013.01)

(58) Field of Classification Search
CPC ............ B01D 46/0004; B01D 46/0005; B01D 46/2411; B01D 46/2414; B01D 2265/021; B01D 2265/022; B01D 2265/026; F02M 35/02416; F02M 35/02483
See application file for complete search history.

(56) References Cited

U.S. PATENT DOCUMENTS

| | | | |
|---|---|---|---|
| 6,736,874 B2 | 5/2004 | Rieger et al. |
| 7,004,986 B2 | 2/2006 | Kopec et al. |
| 7,604,677 B2 | 10/2009 | Tsuruta et al. |
| 8,172,918 B2 | 5/2012 | Grosche et al. |
| 8,940,070 B2 | 1/2015 | Traub |
| 2002/0116909 A1 | 8/2002 | Onoda |

(Continued)

FOREIGN PATENT DOCUMENTS

| | | |
|---|---|---|
| DE | 4018655 A1 | 12/1991 |
| DE | 202005020099 U1 | 5/2007 |

(Continued)

*Primary Examiner* — Robert Clemente
(74) *Attorney, Agent, or Firm* — James Hasselbeck

(57) ABSTRACT

A filter device is provided with a filter housing and a housing cover closing off the filter housing. A filter element is disposed in the filter housing. The filter element comprises a first form-fit part projecting past an outer wall surface of the filter element. The housing cover is provided with a second form-fit part correlated with the first form-fit part. The first and second form-fit parts engage each other in a mounted state of the filter element on the housing cover. The first form-fit part is a laterally projecting hook.

16 Claims, 5 Drawing Sheets

(56) References Cited

U.S. PATENT DOCUMENTS

| | | |
|---|---|---|
| 2005/0235620 A1 | 10/2005 | Connor |
| 2010/0162673 A1* | 7/2010 | Grosche ............ B01D 46/0004 55/482 |

FOREIGN PATENT DOCUMENTS

| | | |
|---|---|---|
| DE | 202008009504 U1 | 12/2009 |
| EP | 2236187 A1 | 10/2010 |

\* cited by examiner

FILTER DEVICE, IN PARTICULAR FOR GAS FILTRATION

CROSS-REFERENCE TO RELATED APPLICATIONS

This application is a continuation application of international application No. PCT/EP2013/067423 having an international filing date of 22 Aug. 2013 and designating the United States, the International Application claiming a priority date of 22 Aug. 2012, based on prior filed German patent application No. 10 2012 016 558.7, the entire contents of the aforesaid international application and the aforesaid German patent application being incorporated herein by reference.

BACKGROUND OF THE INVENTION

The invention concerns a filter device, in particular for gas filtration, for example, an air filter for motor vehicles, comprising a filter element that is received in a filter housing, which can be closed off by a housing cover.

WO 2011/104107 A1 discloses an air filter for the internal combustion engine of a motor vehicle. The air filter comprises within a filter housing an annular filter element that, in its position in the filter housing, can be closed off by a housing cover. The housing cover is detachably connected by means of a bayonet closure on the filter housing, wherein the housing cover can be inserted axially into a cover receptacle formed on the filter housing and, in the inserted state, is rotatable between a release position and a locking position.

SUMMARY OF THE INVENTION

It is the object of the invention to configure a filter device with simple constructive measures such that the filter element can be secured safely in the filter housing.

This object is solved according to the invention in that, on the filter element, a first form-fit part is arranged that projects past the outer wall surface, that has correlated therewith a second form-fit part on the housing cover, wherein the form-fit parts engage each other in the mounted state. The dependent claims provide expedient further embodiments.

The invention concerns a filter device for filtration of a fluid, in particular a gaseous fluid, wherein optionally also a filtration of liquid media is conceivable. According to a preferred embodiment, the inventive filter device is utilized as an air filter for motor vehicles, in particular for an internal combustion engine or for the fresh air to be supplied to the interior of the motor vehicle.

The filter device comprises a filter element that is flowed through by the fluid to be purified and is received in a filter housing which is closed off by a housing cover. On the filter element a first form-fit part is arranged that projects past the outer wall surface of the filter element and that has correlated therewith a second form-fit part on the housing cover. In the mounted state, the form-fit parts on the filter element and on the housing cover engage each other so that form fit, in particular in the circumferential direction, optionally also in at least one axial direction along the longitudinal axis of the filter element, is provided. Due to the form-fit connection between the filter element and the housing cover, that itself is detachably connectable to the filter housing, a safe support and securing of the filter element are provided.

Advantageously, the first form-fit part on the filter element is located at a spacing to a second connecting location between the filter element and the housing cover so that, as a whole, a connection between the housing cover and the filter element is provided by means of at least two spaced apart positions. The additional connection is realized in particular by means of the end face of the filter element, for example, by means of an axially projecting collar, which projects into a recess in the housing cover in a seal-tight manner. The first and the second connecting locations between filter element and housing cover are preferably spaced axially relative to each other. In case of an annular or hollow-cylindrical configuration of the filter element, the first form-fit part can be arranged adjacent to an end face of the filter element which is positioned axially opposite to the additional connecting location.

In principle, a hollow-cylindrical or annular configuration of the filter element, flowed through by the fluid to be purified advantageously radially from the exterior to the interior, is advantageous, wherein the interior represents the clean chamber via which the purified fluid is discharged axially.

In case of a hollow-cylindrical or annular embodiment of the filter element, the latter is provided at least at an axial end face, preferably at both axial end faces, with an end disk with which the first form-fit part is connected. It can be expedient to manufacture the end disk of plastic material and to form the first form-fit part monolithic with the plastic end disk. In case of an annular configuration of the filter element, the first form-fit part projects past the cylindrical wall surface in radial direction. This configuration has the advantage that the form-fit connection can be produced in a constructively simple way in that the first form-fit part on the filter element is formed, for example, as a hook and the second form-fit part on the inner side of the housing cover as a receiving eye into which the hook can be inserted. The hook has advantageously a first hook section which extends in radial direction and is attached to the end disk at the end face of the filter element as well as a second hook section which extends at an angle relative to the first hook section.

The second hook section has either an orientation parallel to the longitudinal axis of the filter element or transverse to the longitudinal axis of the filter element. In the first case, the form-fit connection, which is effected by insertion of hook and receiving eye, can be produced by means of an exclusively axial insertion movement of the housing cover onto the seat in the filter housing. In case of an orientation of the second hook section transverse to the longitudinal axis of the filter element, a bayonet connection between filter element and housing cover is conceivable in which first the filter element and the housing cover are caused to approach axially and subsequently carry out a rotational movement about the longitudinal axis of the filter element relative to each other that leads to the form-fit connection of the form-fit parts. In case of the bayonet closure, the form fit is existing in particular in both axial directions.

The housing cover, according to a further advantageous embodiment, may comprise a first cover section, which in the mounted state is in front of the end face of the filter element, as well as a second cover section which is embodied at an angle to the first cover section and extends at a spacing to the wall surface of the filter element. The second form-fit part at the cover is located on the second cover section. The first and the second cover sections that are preferably monolithically embodied form together an L-shaped cross-section of the housing cover.

It can be expedient to provide, on an end-face end disk that is provided with a central recess, a sealing part by injection molding which is resting seal-tightly on the housing cover in the mounted state. The sealing part is, for example, embodied as a 2-component part. In this embodiment, additional connecting measures between filter element and housing cover may be optionally omitted. At the same time, embodiments are also possible in which, in addition to the form-fit connection, the filter element is mechanically, or in another way, connected with the housing cover, for example, by a screw connection.

According to a further expedient embodiment which relates to a bayonet connection between filter element and housing cover, form-fit elements which are designed for a bayonet locking action are arranged, respectively, on the end face of the hollow-cylindrical or annular filter element, on the one hand, and on the cover section of the housing cover that is in front of the end face, on the other hand. This enables an axial approach between filter element and housing cover until the form-fit elements engage and, subsequently, enables a rotation about the longitudinal axis of the filter element up to the point of reaching the final mounting position in which the form-fit parts, arranged so as to face away from the form-fit elements on the end face, engage each other.

It can be expedient to embody the first form-fit part which is, for example, of a hook shape, to be elastic springy. This has the advantage that component and mounting tolerances can be compensated better.

According to a further expedient embodiment, the first form-fit part which is arranged on the filter element comprises a hinge, for example, a film hinge, that can be folded into at least two different positions. This makes it possible that the first form-fit part, during the locking movement with the housing cover with the hinge being in the folded-open position, remains initially in a first position in which there is no form fit yet with the second form-fit part, and is adjusted into the second position, in which the form fit with the second form-fit part is produced, for example, for realizing a bayonet closure, only after reaching an axial end position. The hinge axis extends in this connection transversely to the longitudinal axis of the filter element.

Expediently, a hinge axis can also be embodied along the longitudinal axis of the filter element in order to enable a push button attachment.

BRIEF DESCRIPTION OF THE DRAWINGS

Further advantages and expedient embodiments can be taken from the additional claims, the figure description, and the drawings.

In the Figures, same components are provided with same reference characters.

DESCRIPTION OF PREFERRED EMBODIMENTS

Figure 1:
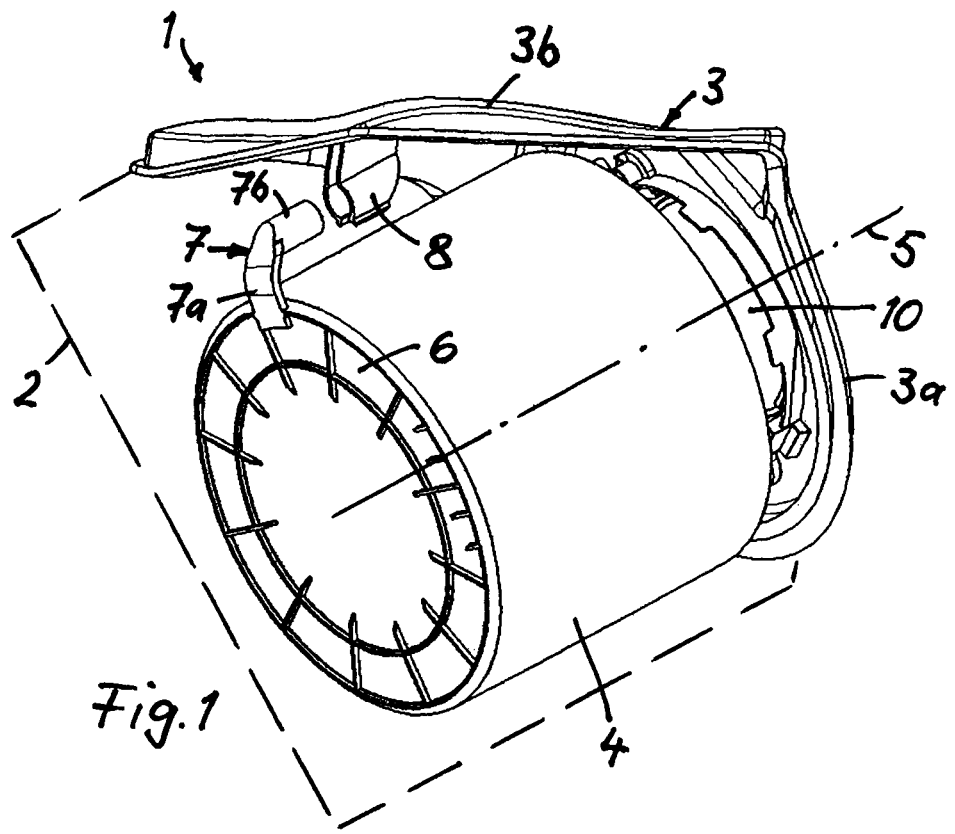
FIG. 1 shows an air filter with an annular filter element in a filter housing which can be closed off by a housing cover, comprising a hook-shaped form-fit part that is projecting laterally at an end face of the filter element and that has correlated therewith a receiving eye on the inner wall of the filter cover.
Figure 2:
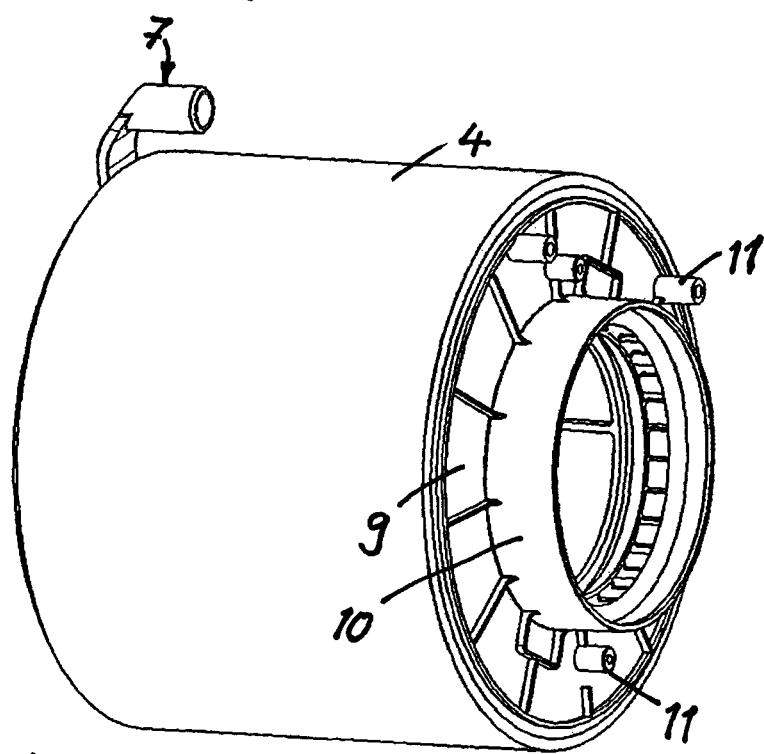
FIG. 2 shows the filter element of FIG. 1 in a perspective individual illustration.

In FIGS. 1 and 2, as a first embodiment, a filter device 1 is illustrated that is used as an air filter for the internal combustion engine of a motor vehicle. The filter device 1 comprises a filter housing 2 in which a receiving chamber for receiving a filter element 4 is formed wherein the receiving chamber is closable by a housing cover 3. The filter element 4 is hollow-cylindrical or annular and, relative to the longitudinal axis 5 of the filter element, is flowed through in radial direction from the exterior to the interior by the sucked-in ambient air. The interior of the filter element 4 constitutes the clean chamber via which the axial discharge is realized.

The filter element 4 is provided at both axial end faces with an end disk 6, 9, respectively. At the end disk 6 which is neighboring the bottom of the filter housing 2, a first hook-shaped form-fit part 7 is arranged which, in the mounted state, projects with form fit into a second form-fit part 8 designed as a receiving eye on the inner wall of the housing cover 3. The end disk 6 is expediently designed as a plastic component; the hook-shaped first form-fit part 7 can be formed monolithic with the end disk 6.

The hook-shaped form-fit part 7 comprises a first hook section 7a which, relative to the longitudinal axis 5 of the filter element 4, extends radially outwardly and projects past the wall surface of the filter element 4 in radial direction. A pin-shaped hook section 7b extending in axial direction adjoins the radial hook section 7a and, in the mounted state, projects into the second form-fit part 8 designed as a receiving eye, wherein the opening in the receiving eye also extends in axial direction. In the assembled state, a form-fit connection between the filter element 4 and the housing cover 3 by means of form-fit parts 7, 8 is existing therefore in circumferential direction as well as axially in one direction.

The housing cover 3 comprises two cover sections 3a, 3b which are formed monolithic with each other but are angularly positioned relative to each other. The first cover section 3a is arranged in front of the upper end face of the filter element 4 where the end disk 9 is arranged; the upper end disk 9 is positioned axially opposite the lower end disk 6, wherein the hook-shaped form-fit part 7 is arranged on the lower end disk 6.

A collar 10 is formed monolithic with the upper end disk 9, is axially projecting, and delimits an end-face opening in the filter element 4 which communicates with the interior that constitutes the clean side. The collar 10 projects into a recess in the cover section 3a and can be screw-connected with the cover section 3a. For this purpose, support sleeves 11 are provided on the end disk 9 of the filter element 4.

For a flow-tight connection between the collar 10 and the housing cover 3, an additional sealing ring can be provided which is placed about or into the collar 10. A seal can be arranged outside but also inside the collar 10. It is also possible to embody the collar 10 as a 2-component part that has sealing properties and that, by being introduced into the recess in the cover section 3a, also is received seal-tightly in the cover section 3a. In this case, it is possible to dispense with a screw connection between the filter element 4 and the housing cover 3.

The two covers sections 3a and 3b are positioned at an angle relative to each other which, as shown in FIG. 1, is greater than 90°. In principle, embodiments with an angle of 90° or smaller than 90° are possible also.

Figure 3:
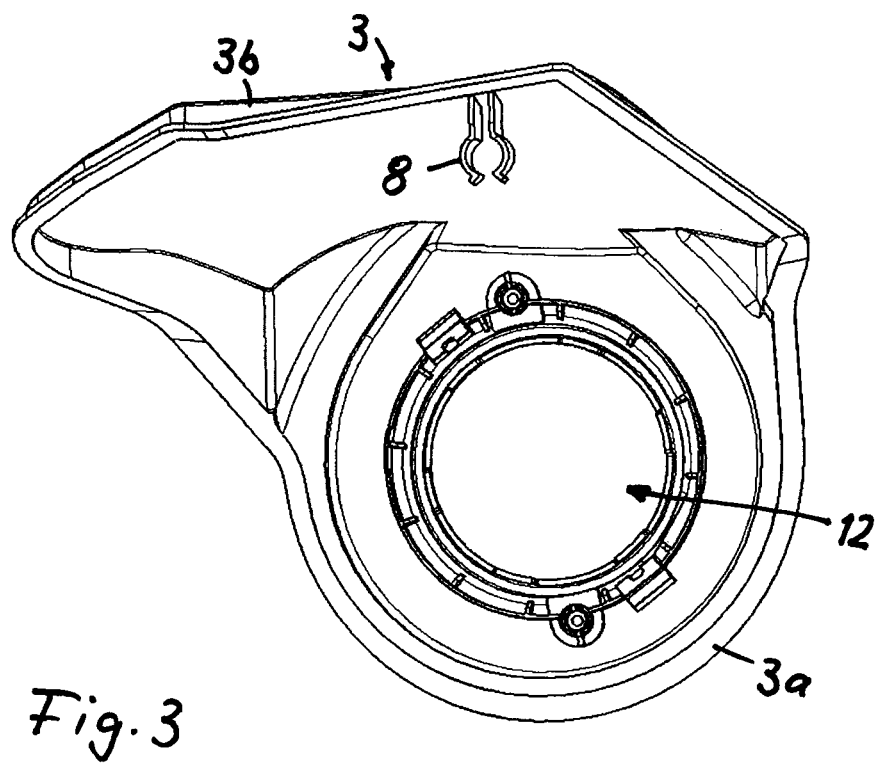
FIG. 3 shows an interior view of a housing cover with a receiving eye in a further embodiment.

In the embodiment according to FIG. 3, the housing cover 3 has also two cover sections 3*a*, 3*b* which are positioned relative to each other at an angle. In the cover section 3*a*, a recess 12 is provided for receiving the collar 10 on the end face of the filter element 4. The second form-fit part 8 at the housing cover 3 has two webs formed on the inner side of the housing cover 3 which delimit an intermediately positioned opening. The webs are designed to be elastic springy so that the hook-shaped first form-fit part 7 on the filter element 4 can be inserted axially as well as radially into the receiving opening of the form-fit part 8 positioned between the webs.

Figure 4:
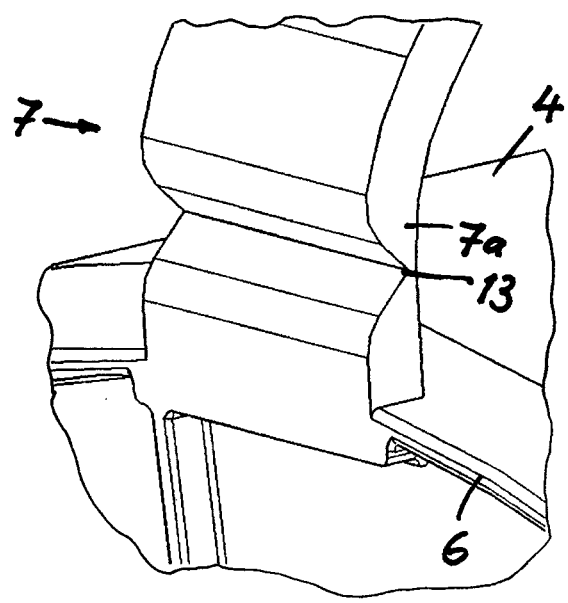
FIG. 4 shows in an enlarged illustration a film hinge by means of which a hook-shaped form-fit element is arranged on the end disk at the end face of the filter element.

In the embodiment according to FIG. 4, 7 a film hinge 13 in the form of a tapering wall thickness is provided in the first hook section 7*a* of the hook-shaped form-fit part 7 so that the hook section 7*a* can be pivoted about the hinge axis. The hinge axis which extends transversely to the longitudinal axis 5 of the filter element 4 enables, for example, a bayonet closure between filter element 4 and housing cover 3 in that first the filter element 4 and the housing cover 3 are caused to approach each other axially and subsequently are rotated relative to each other about the longitudinal axis 5 of the filter element 4. After reaching the final mounting position, the hook-shaped form-fit part 7 can be folded about the film hinge 13 so that the hook-shaped form-fit part 7 is moved into the form-fit position with the correlated form-fit part 8 on the inner side of the housing cover 3.

Figure 5:
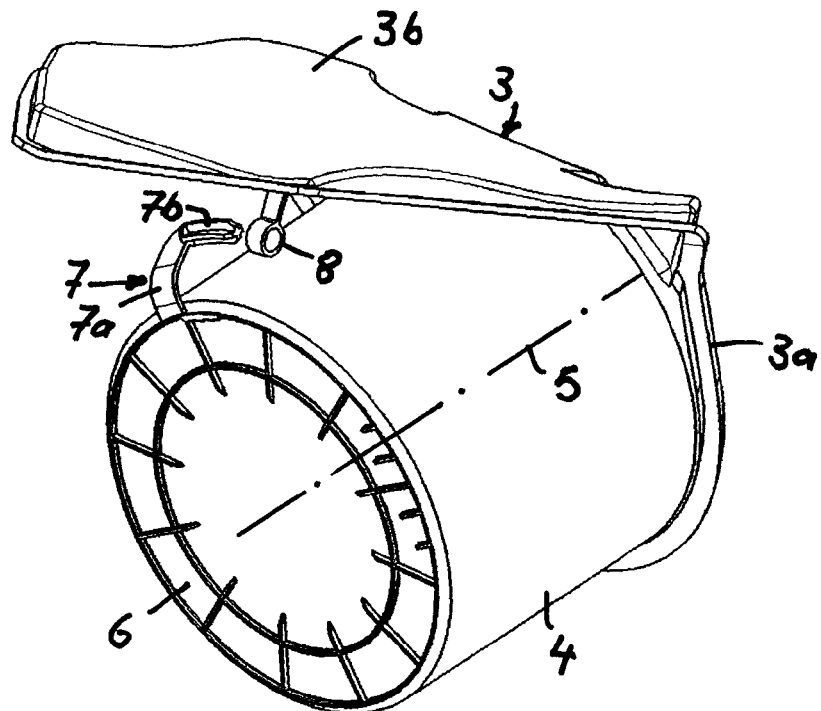
FIG. 5 shows a filter element with a housing cover in a further embodiment in which the hook-shaped form-fit part on the filter element comprises a hook section which is extending in transverse direction.
Figure 6:
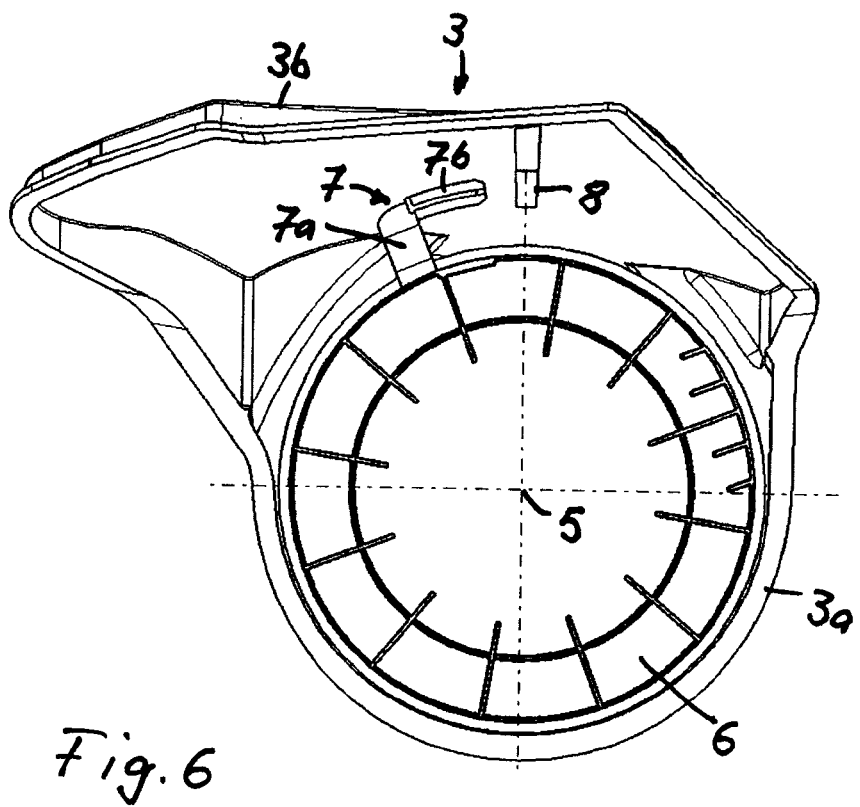
FIG. 6 shows the air filter according to FIG. 5 in an end face view onto the filter element and the housing cover.
Figure 7:
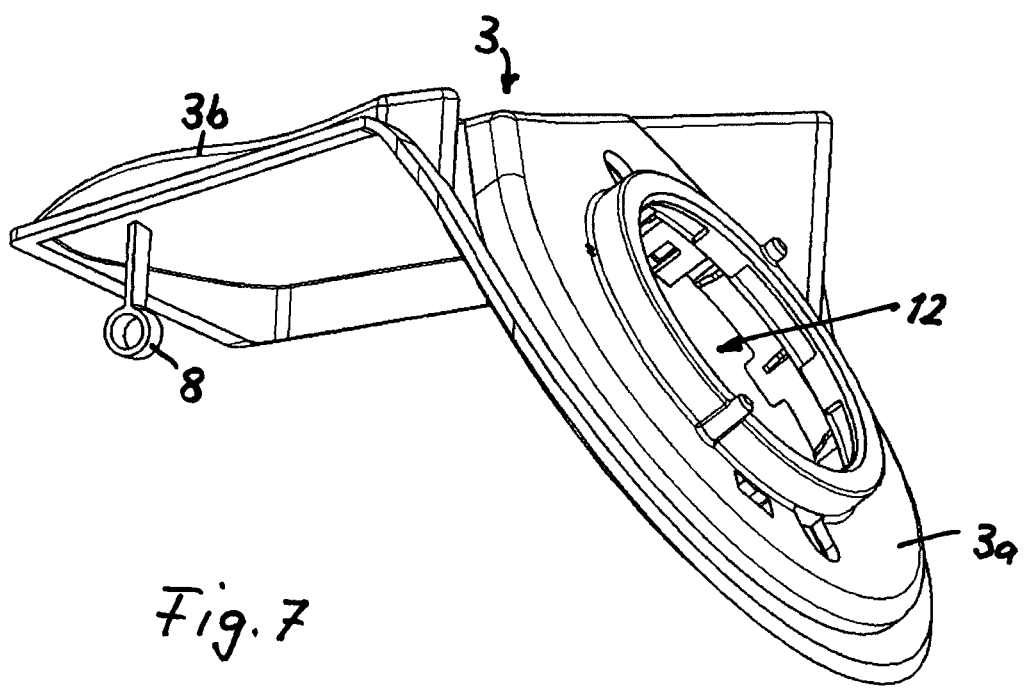
FIG. 7 shows the housing cover of the embodiment according to FIGS. 5 and 6 in a perspective individual illustration.

In FIGS. 5 to 7, a further embodiment is illustrated in which the filter element 4 is also provided in the area of its end disk 6 at the end face with a hook-shaped first form-fit part 7. The first hook section 7*a* projects radially and projects past the wall surface of the filter element 4 in radial direction. In contrast to the embodiment according to FIGS. 1 and 2, the adjoining second hook section 7*b* does not extend however in axial direction but transversely to the longitudinal axis 5 of the filter element 4. The second form-fit part 8 on the inner side of the cover part 3*b* of the housing cover 3 has an opening that is also pointing in transverse direction and receives the hook section 7*b* in the mounted state. The mounting position is achieved by a bayonet closure with which, after axial approach, the filter element 4 and the housing part 3 are rotated relative to each other about the longitudinal axis 5 of the filter element 4 until the hook section 7*b* projects into the opening of the form-fit part 8.

Figure 8:
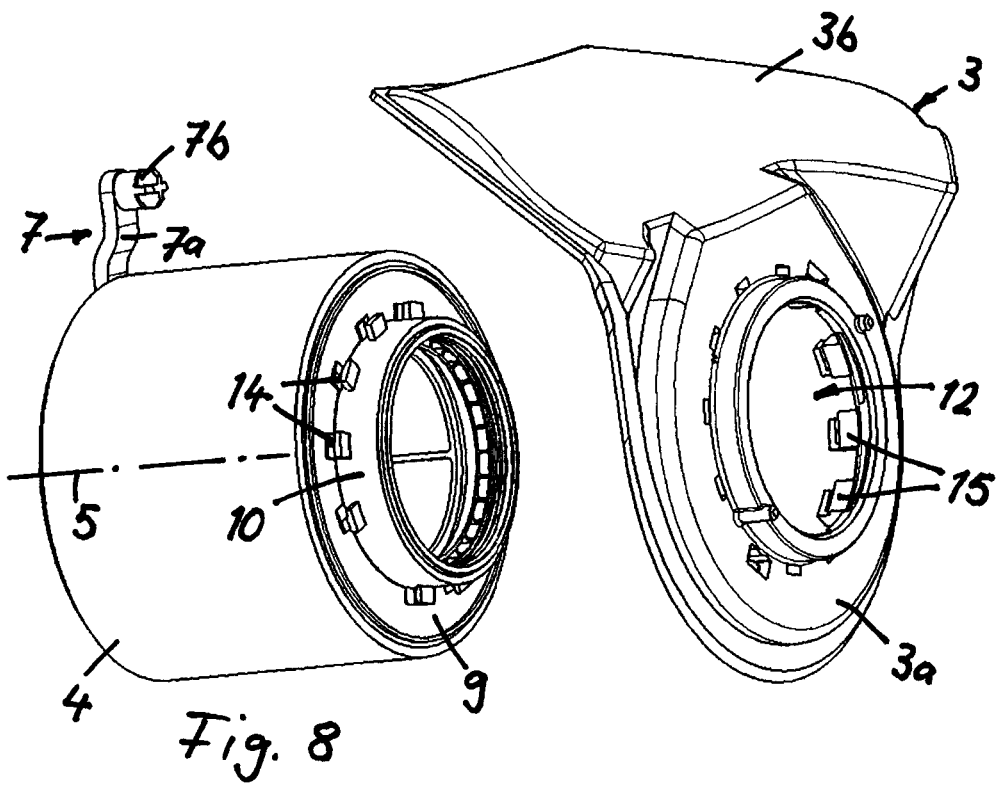
FIG. 8 shows a further embodiment of an air filter in which the filter element is locked by means of a bayonet closure with the housing cover.
Figure 9:
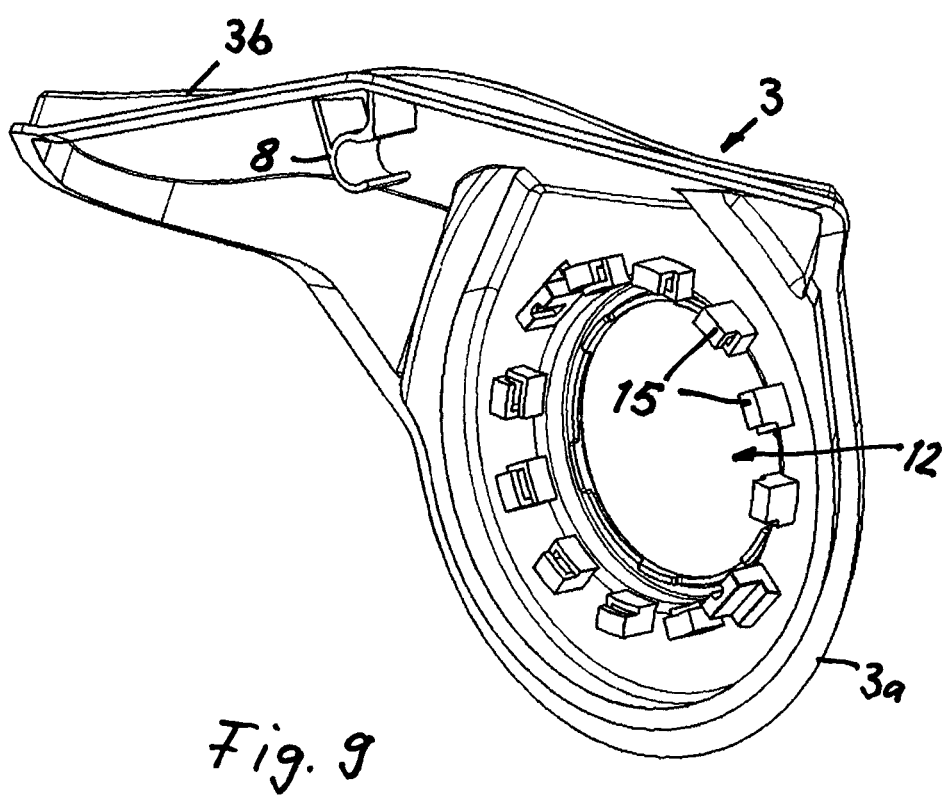
FIG. 9 shows the housing cover of the embodiment according to FIG. 8 in a perspective individual illustration.

In the embodiment according to FIGS. 8 and 9, the connection between the filter element 4 and the housing part 3 is also realized by a bayonet closure. On the upper end disk 9, several form-fit elements 14 are arranged on the collar 10 distributed about the circumference and have further form-fit elements 15 associated therewith on the cover section 3*a* of the housing cover 3. The form-fit elements 14, 15 can be moved by axial approach of filter element 4 and housing cover 3 and subsequent rotation about the longitudinal axis 5 of the filter element 4 into a form-fit position relative to each other in which the filter element 4 in axial direction is secured with form fit on the housing cover 3.

A further form fit is achieved by the first form-fit part 7 in the area of the lower end disk of the filter element 4 and the second form-fit part 8 at the inner side of the cover section 3*b* of the housing cover 3. The first form-fit part 7 is embodied similar to a hook and has a radially projecting first hook section 7*a* as well as a second pin-shaped hook section 7*b* extending in axial direction. The second form-fit part 8 arranged on the inner side of the housing cover 3 has a receiving opening that is open half way in transverse direction into which the hook section 7*b* is inserted in transverse direction upon rotational movement during the bayonet-type closure action.

While specific embodiments of the invention have been shown and described in detail to illustrate the inventive principles, it will be understood that the invention may be embodied otherwise without departing from such principles.

What is claimed is:

1. A filter device comprising:
   a filter housing;
   a housing cover closing off the filter housing;
   a filter element disposed in the filter housing;
   the filter element comprising:
      a hollow filter medium elongated in a longitudinal direction;
      a second end disk arranged on a second longitudinal end face of the filter medium, the second end disk having a central recess extending completely through the second end disk;
      a first end disk arranged on a first longitudinal end face of the filter medium, the first end disk having:
         a first form fit part having:
            a first hook section having a first end secured onto the first end disk, the first hook section projecting laterally outwards to a second end positioned beyond a lateral outer wall surface of the filter medium;
            a second hook section having a first end secured onto the second end of the first hook section, the second hook section projecting longitudinally towards the second end disk to a second end, the second end of the second hook section positioned longitudinally between the first end disk and the second end disk and proximate to the outer wall surface of the filter medium;
   the housing cover comprising a second form-fit part correlated with the first form-fit part;
   wherein the first and second form-fit parts engage each other in a mounted state of the filter element on the housing cover,
   wherein the first form-fit part comprises a hinge and is foldable into at least two different positions.

2. The filter device according to claim 1, wherein the filter element further includes
   a sealing part that is resting seal-tightly on the housing cover and is injection-molded onto the second end disk.

3. The filter device according to claim 1, wherein the first hook section comprises a hook section portion extending in the longitudinal direction of the filter element.

4. The filter device according to claim 3, wherein the second hook section projects transverse to the longitudinal direction around a portion of a circumference of the outer wall surface of the filter medium;
   wherein the second hook section is configured to engage the second form-fit part when the filter element is rotated with respect to the housing cover during installation.

5. The filter device according to claim 1, wherein the first form-fit part is elastic springy.

6. A filter device, comprising:
   a filter housing;
   a housing cover closing off the filter housing;
   a filter element disposed in the filter housing;
   the filter element comprising:
      a hollow filter medium elongated in a longitudinal direction;
      a second end disk arranged on a second longitudinal end face of the filter medium, the second end disk having a central recess extending completely through the second end disk;
a first end disk arranged on a first longitudinal end face of the filter medium, the first end disk having:
a first form fit part having:
a first hook section having a first end secured onto the first end disk, the first hook section projecting laterally outwards to a second end positioned beyond a lateral outer wall surface of the filter medium;
a second hook section having a first end secured onto the second end of the first hook section, the second hook section projecting longitudinally towards the second end disk to a second end, the second end of the second hook section positioned longitudinally between the first end disk and the second end disk and proximate to the outer wall surface of the filter medium;
the housing cover comprising a second form-fit part correlated with the first form-fit part;
wherein the first and second form-fit parts engage each other in a mounted state of the filter element on the housing cover,
wherein the second form-fit part is a receiving eye arranged on an inner side of the housing cover, the second form fit part configured to receive and engage the second hook section into the receiving eye of the second form-fit part.

7. The filter device according to claim 6, wherein
the housing cover comprises a first cover section and a second cover section,
wherein the first cover section is positioned in front of the first longitudinal end face of the filter element, and
wherein the second cover section is arranged angularly relative to the first cover section,
wherein the second form-fit part is arranged on the second cover section.

8. The filter device according to claim 7, further comprising
first and second form-fit elements providing a bayonet locking action between the housing cover and the filter element,
wherein the first form-fit elements are arranged on the end face of the filter element and the second form-fit elements are arranged on the first cover section,
wherein the filter element is rotated with respect to the housing cover to engage and disengage the bayonet locking action of the first and second form-fit elements.

9. The filter device according to claim 6, wherein
the filter element further includes
a sealing part that is resting seal-tightly on the housing cover and is injection-molded onto the second end disk.

10. The filter device according to claim 6, wherein
the first hook section comprises a hook section portion extending in the longitudinal direction of the filter element.

11. A filter element comprising:
a hollow filter medium elongated in a longitudinal direction;
a second end disk arranged on a second longitudinal end face of the filter medium, the second end disk having a central recess extending completely through the second end disk;
a first end disk arranged on a first longitudinal end face of the filter medium, the first end disk having:
a first form fit part having:
a first hook section having a first end secured onto the first end disk, the first hook section projecting outwards away from the first end disk to a second end positioned beyond a radially outer wall surface of the filter medium; and
a second hook section having a first end secured onto the second end of the first hook section, the second hook section adapted to engage with a complimentary form fit part of a filter housing when the filter element is in an installed state in a filter housing configured to receive the filter element;
wherein the second end disk includes bayonet closure elements, including:
a plurality of form-fit elements secured onto or formed integrally together with the second end disk, the plurality of form-fit elements adapted to receive and engage complimentary form-fit elements of the filter housing, thereby forming a rotationally engaged bayonet connection when the filter element is in the installed state.

12. The filter element according to claim 11, wherein
the plurality of form-fit elements have a radially outwardly facing slot or groove.

13. The filter element according to claim 11, wherein
rotating the filter element about a longitudinal axis in the filter housing into the installed state, engages simultaneously the first form fit part and the bayonet closure elements with the filter housing, mounting the filter element to the filter housing.

14. The filter element according to claim 11, wherein
the second end disk has an annular collar arranged on an exterior surface of the second end disk, encircling the central recess, the annular collar having an open interior connecting to a hollow interior of the filter medium,
wherein the annular collar is elongated to project axially outwardly away from the second end disk and filter element;
wherein the plurality of form-fit elements are arranged directly on a radially outer circumferential surface of the annular collar and project radially outwardly from the radially outer circumferential surface of the annular collar.

15. The filter element according to claim 11, wherein
the second hook section is a cylindrical member projecting axially from the first hook section towards the second end disk.

16. The filter element according to claim 14, wherein
the plurality of form-fit elements are distributed at an irregular circumferential spacing on the exterior surface of the second end disk.

* * * * *